May 23, 1950     J. G. HEUER     2,508,945
MILK BOTTLE HOLDER
Filed Jan. 23, 1947
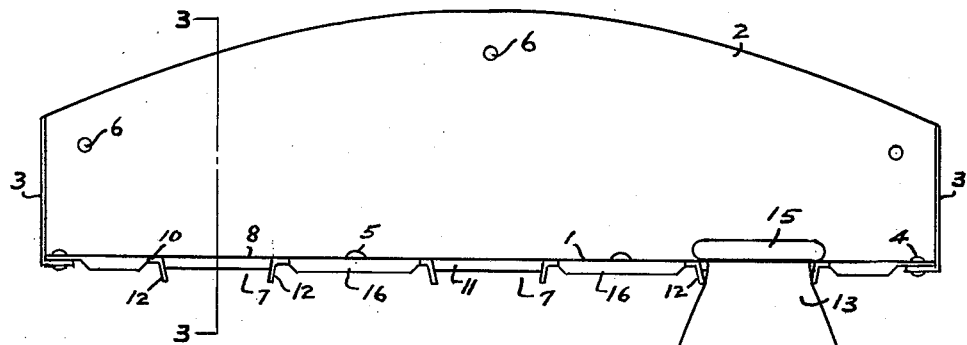
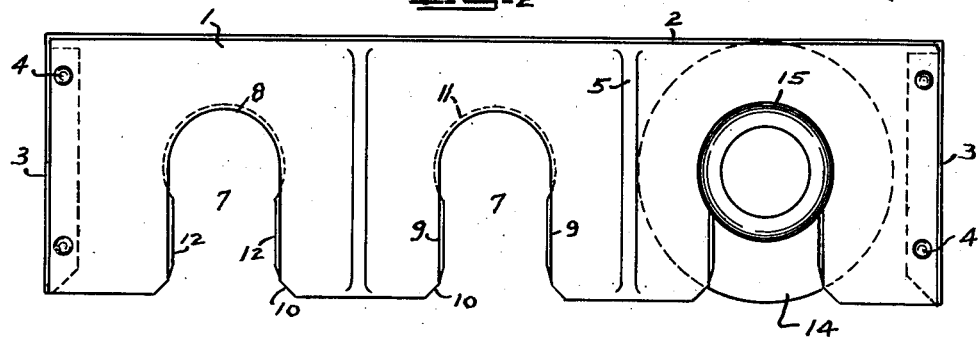
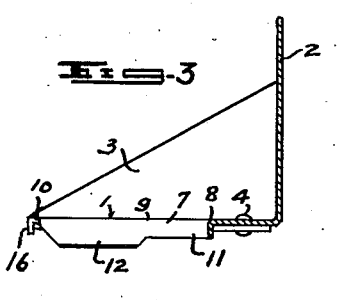
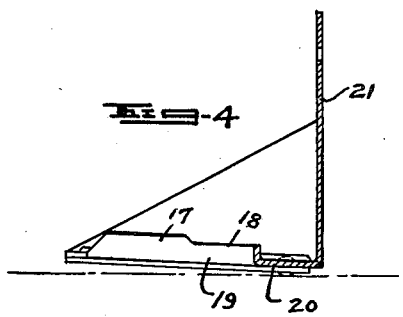
Inventor
JOSEPH G. HEUER
By Jack D. Snyder
Attorney Patented May 23, 1950

2,508,945

UNITED STATES PATENT OFFICE 2,508,945

MILK BOTTLE HOLDER

Joseph G. Heuer, Pittsburgh, Pa.

Application January 23, 1947, Serial No. 723,847

1 Claim. (Cl. 211—75)

This invention relates to a milk bottle holder, and important objects and advantages thereof are to provide a holder of the character described, which is adapted for supporting a plurality of filled or empty milk bottles in suspended position so that breakage of said bottles from being knocked over is reduced to a minimum and so that said bottles are out of reach of animals, which may be conveniently employed for engaging the bottles therein and for removing the latter therefrom, which is simple in its construction and arrangement, durable, compact, attractive in appearance, and comparatively economical in its manufacture, installation and use.

With the foregoing and other objects in view which will appear as the description proceeds, the invention resides in the novel construction, combination, and arrangement of parts herein specifically described and illustrated in the accompany drawing, but it is to be understood that changes in the form, proportions, and details of construction may be resorted to that come within the scope of the claim hereunto appended.

In the drawing wherein like numerals of reference designate corresponding parts throughout the several views:

Figure 1 is a front elevational view of a milk bottle holder constructed in accordance with the invention, and illustrating the suspension of a bottle therein.

Figure 2 is a top plan view thereof.

Figure 3 is a transverse cross sectional view of the device taken on line 3—3, Figure 1.

Figure 4 is a central transverse cross sectional view of a modified form of milk bottle holder embodying the invention.

Referring in detail to the drawing the improved milk bottle holder is preferably constructed of a unitary piece of any suitable sheet metal, and comprises a horizontally, flatwise disposed base plate 1, an edgewise vertically disposed back plate 2, and a pair of end braces 3.

The base plate 1 extends forwardly from and at right angles to the back plate 2, and is rigidly secured in such position by the connection of the end plates 3 therewith, by means of rivets 4, or by welding. The rigidity of the base plate is further augmented by a pair of regularly spaced, transversely extending, reenforcing ribs 5, which are formed in said base plate. The back plate is provided with a plurality of apertures 6 for the passage of any suitable fastening elements by which the holder is secured in position to any desired supporting structure.

The base plate 1 is provided with a plurality of regularly spaced, substantially U-shaped slots 7, which have their curved inner walls 8 spaced from the back plate 2, and which are open at their outer ends. The outer ends of the side walls 9, of each of the slots, are preferably bevelled, as indicated at 10.

The inner wall 8, of each of the slots 7, is formed with a comparatively narrow, vertically depending, reenforcing flange 11, and each of the side walls 9, of each of the slots, is formed with a relatively wider, depending, clamping flange 12 having bevelled ends. The clamping flanges 12, of the side walls 9 of each slot, extend at a slight angle from the vertical to dispose the lower free edges thereof toward each other.

While the embodiment of the invention, illustrated in the drawing, shows but three slots 7, it will be obvious that the number of such slots may be varied to best meet conditions found in practice.

Each of the slots 7 is designed and intended to receive the reduced upper end of the neck 13 of a conventional type of milk bottle 14, with the top ring 15 of the latter seating or resting on the curved edge margin at the inner end of the engaged recess. By this arrangement the bottle is supported by the ring 15, and hangs perpendicularly from the holder structure, as shown in Figure 1.

The clamping flanges 12, of each of the recesses 7, resiliently and frictionally engage the bottle neck 13 when the latter is being engaged in the slot, and thereby prevent the inadvertent removal of the engaged bottle. Such resilient action is effected and augmented by contructing the clamping flanges 12 with a greater width than width of the associated curved reenforcing flange 11, as stated, whereby both ends of each clamping flange is free to a considerable extent.

The front edge of the base plate 1 is preferably provided with a depending reenforcing flange 16 to stiffen said edge intermediate of the slots 7, which open at the free forward edge of the base plate.

The modified form of milk bottle holder, illustrated in Figure 4, differs from the embodiment of the invention above described, principally in that the clamping flanges 17 and the curved reenforcing flange 18, of each of the slots 19 in the base plate 20, project upwardly from the latter instead of depending therefrom. Further, the base plate 20 preferably inclines at a slight angle from the horizontal from its attachment with the associated back plate 21 toward its free forward edge, to minimize the possibility of the engaged milk bottles from slipping from the slots 19 by gravity movement.

The present invention provides a most durable and efficient device of its kind, which may be economically constructed and successfully employed for the purposes and in the manner herein set forth.

What I claim is:

A milk bottle holder constructed of a single piece of sheet material and comprising an edgewise disposed back plate, a horizontally disposed back plate projecting forwardly from said back plate, a plurality of regularly spaced slots formed in said base plate and being substantially U-shaped, each of said slots adapted for receiving and engaging the neck of a milk bottle for suspending the latter from said base plate, a reenforcing flange extending from the curved wall of each of said slots, and a pair of clamping flanges declining toward each other from respective side walls of each of said slots at an angle from the vertical and being of greater widths than the width of the associated reenforcing flange for resiliently engaging the neck of the bottle to retard the engagement of the bottle in the slot and to retard the removal of the bottle from the slot, the outer ends of said flanges being bevelled to facilitate the insertion of the neck of the bottle into said slot, and the inner ends of the flanges being bevelled to engage the neck of the bottle for maintaining the latter in said slot.

JOSEPH G. HEUER.

REFERENCES CITED

The following references are of record in the file of this patent:

UNITED STATES PATENTS

| Number | Name | Date |
| --- | --- | --- |
| 1,449,275 | Feist | Mar. 20, 1923 |
| 1,701,783 | Law | Feb. 12, 1929 |
| 2,028,694 | Spinks | Jan. 21, 1936 |